US009878439B2

(12) United States Patent
May

(10) Patent No.: US 9,878,439 B2
(45) Date of Patent: Jan. 30, 2018

(54) HAND DRILL LIFTING AND ACTUATING APPARATUS

(71) Applicant: Shane May, Auburn, WA (US)

(72) Inventor: Shane May, Auburn, WA (US)

( * ) Notice: Subject to any disclaimer, the term of this patent is extended or adjusted under 35 U.S.C. 154(b) by 2 days.

(21) Appl. No.: 14/656,248

(22) Filed: Mar. 12, 2015

(65) Prior Publication Data

US 2016/0263738 A1   Sep. 15, 2016

(51) Int. Cl.
*B25H 1/00* (2006.01)
*B23B 45/00* (2006.01)

(52) U.S. Cl.
CPC ........... *B25H 1/0035* (2013.01); *B23B 45/00* (2013.01); *B25H 1/0057* (2013.01); *B23B 2260/096* (2013.01); *Y10S 408/712* (2013.01); *Y10T 408/6786* (2015.01)

(58) Field of Classification Search
CPC ............ Y10T 408/6786; Y10T 408/91; Y10S 408/712; B23B 45/00; B23B 2260/096; B25H 1/0035
See application file for complete search history.

(56) References Cited

U.S. PATENT DOCUMENTS

| | | | | |
|---|---|---|---|---|
| 2,140,854 A * | 12/1938 | Schnebly | ............. | B25H 1/0035 144/104 |
| 2,405,110 A * | 8/1946 | Bullock | ............... | B25H 1/0035 173/141 |
| 2,720,125 A * | 10/1955 | Palik | ................... | B25H 1/0035 254/106 |
| 2,889,723 A * | 6/1959 | Morrell | ................ | B25H 1/0035 173/141 |
| 2,947,204 A * | 8/1960 | Pine | ..................... | B25H 1/0035 173/141 |
| 4,442,905 A * | 4/1984 | Agoston | ............. | B25H 1/0035 173/36 |
| 4,736,804 A * | 4/1988 | Geibel | ................. | B25H 1/0035 173/30 |
| 5,137,235 A * | 8/1992 | Wentworth | .......... | B25H 1/0035 248/124.1 |
| 5,322,397 A * | 6/1994 | Spear | ................... | B25H 1/0035 173/36 |

(Continued)

FOREIGN PATENT DOCUMENTS

| | | | | |
|---|---|---|---|---|
| CH | 432189 A | * | 3/1967 | ........... B25H 1/0035 |
| CH | 448682 A | * | 12/1967 | ........... B25H 1/0035 |

(Continued)

*Primary Examiner* — Eric A Gates
(74) *Attorney, Agent, or Firm* — Han Santos, PLLC

(57) ABSTRACT

A hand drill lifting and actuating apparatus includes a post has a bottom end and a top end. The post is telescopic and includes an upper section and a lower section. A mount is attached to the top end and releasably secures a drill to the post. An actuator is mounted on the post and engages a switch on the drill to turn the drill on. A fulcrum is attached to the lower section of the post. A handle has a first end and a second end. The first end is pivotally coupled to the upper section. The handle is pivotally coupled to the fulcrum between the first and second ends such that the upper section is lifted upwardly when the second end is urged downwardly. The mount is thereby urged upwardly when the second end is pulled downwardly.

11 Claims, 5 Drawing Sheets

(56) References Cited

U.S. PATENT DOCUMENTS

| | | | | |
|---|---|---|---|---|
| 5,820,317 A * | 10/1998 | Van Troba | ............ | B25H 1/0035 408/136 |
| 6,095,724 A * | 8/2000 | Hurt | .................... | B25H 1/0035 408/136 |
| 6,666,282 B2 * | 12/2003 | Merrick | ............... | B25H 1/0035 173/31 |
| 7,226,252 B2 * | 6/2007 | Glodowski | .......... | B25H 1/0064 408/1 R |
| 7,789,353 B2 | 9/2010 | Koerlin et al. | | |
| 9,174,337 B2 * | 11/2015 | Buchner | ............... | B25H 1/0035 |
| 2004/0240952 A1 * | 12/2004 | Perry | ..................... | B23B 39/14 408/136 |
| 2005/0214085 A1 * | 9/2005 | Owens | ................. | B25H 1/0057 408/136 |
| 2005/0276670 A1 * | 12/2005 | Freund | ................ | B25H 1/0035 408/129 |
| 2010/0140445 A1 * | 6/2010 | Koerlin | ............... | B25H 1/0035 248/674 |

FOREIGN PATENT DOCUMENTS

| | | | | | |
|---|---|---|---|---|---|
| CH | 502867 A | * | 2/1971 | ............ | B25H 1/0035 |
| DE | 1906584 A1 | * | 8/1970 | ............ | B25H 1/0035 |
| DE | 2541194 A1 | * | 3/1977 | ............ | B25H 1/0035 |
| DE | 2546907 A1 | * | 6/1977 | ................ | B25H 1/00 |
| DE | 2643598 A1 | * | 3/1978 | ............ | B25H 1/0035 |
| DE | 3015532 A1 | * | 10/1981 | ............ | B25H 1/0035 |
| DE | 3202737 A1 | * | 8/1983 | ......... | B23Q 11/0046 |
| DE | 3922611 A1 | * | 1/1991 | ............ | B25H 1/0035 |
| DE | 19501663 A1 | * | 7/1996 | ............ | B25H 1/0035 |
| DE | 202014006361 U1 | * | 10/2014 | ............ | B25H 1/0035 |
| FR | 1442017 A | * | 6/1966 | ............ | B25H 1/0035 |
| FR | 1501012 A | * | 11/1967 | ............ | B25H 1/0035 |
| FR | 2750628 A1 | * | 1/1998 | ............ | B25H 1/0035 |

* cited by examiner

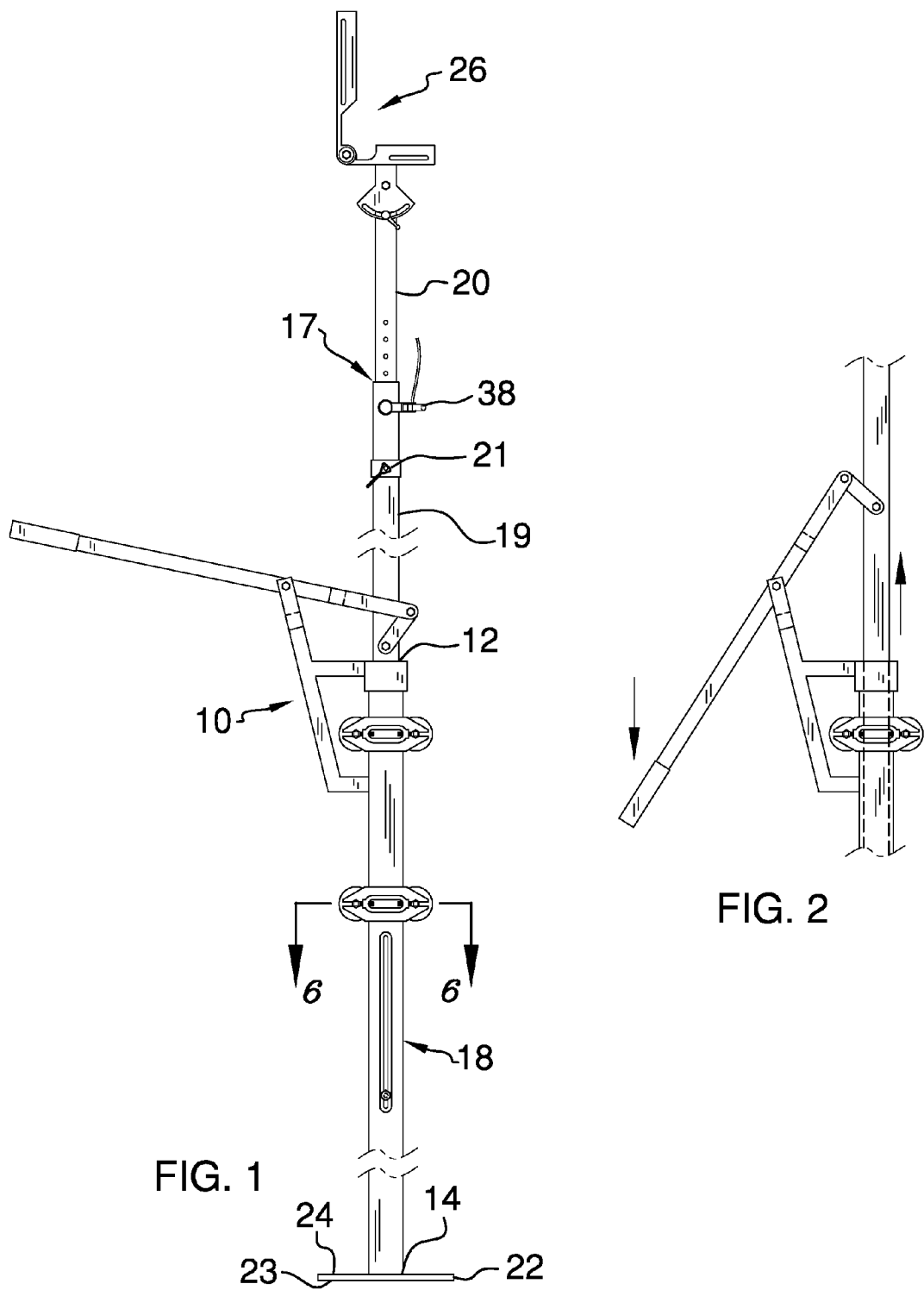

HAND DRILL LIFTING AND ACTUATING APPARATUS

BACKGROUND OF THE DISCLOSURE

Field of the Disclosure

The disclosure relates to drill stabilizing devices and more particularly pertains to a new drill stabilizing device for holding and moving a drill vertically upwards for the purpose of boring a hole in an overhead structure that is not easily reachable from a floor surface.

SUMMARY OF THE DISCLOSURE

An embodiment of the disclosure meets the needs presented above by generally comprising a post has a bottom end and a top end. The post is telescopic and includes an upper section and a lower section. A mount is attached to the top end and is configured to releasably secure a drill to the post. An actuator is mounted on the post and is configured to engage a switch on the drill to turn the drill on. A fulcrum is attached to the lower section of the post. A handle has a first end and a second end. The first end is pivotally coupled to the upper section. The handle is pivotally coupled to the fulcrum between the first and second ends such that the upper section is lifted upwardly when the second end is urged downwardly. The mount is thereby urged upwardly when the second end is pulled downwardly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a side view of a hand drill lifting and actuating apparatus according to an embodiment of the disclosure.

FIG. 2 is a broken side view of an embodiment of the disclosure.

DESCRIPTION OF THE PREFERRED EMBODIMENT

Figure 3:
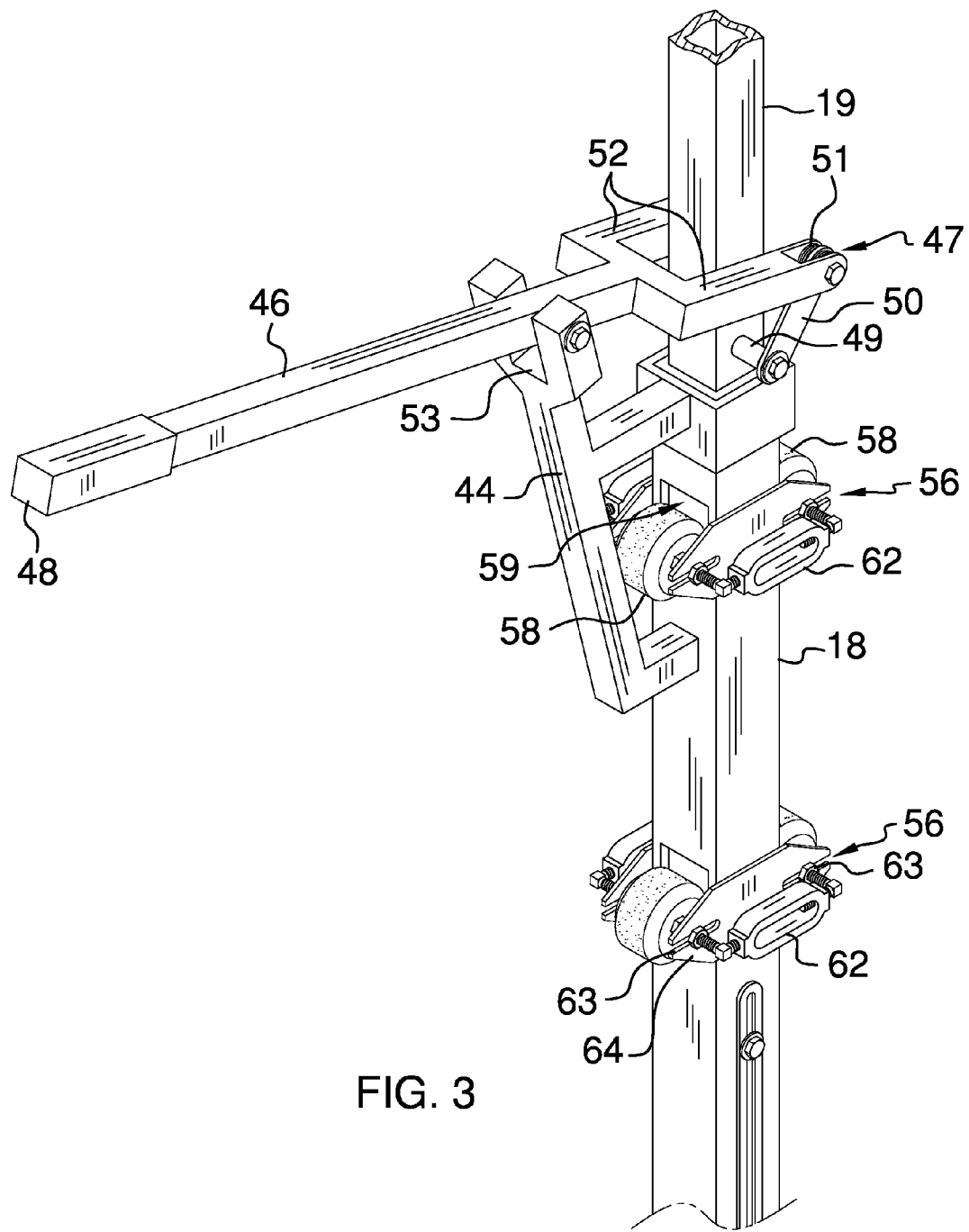
FIG. 3 is a broken, rear perspective view of an embodiment of the disclosure.
Figure 4:
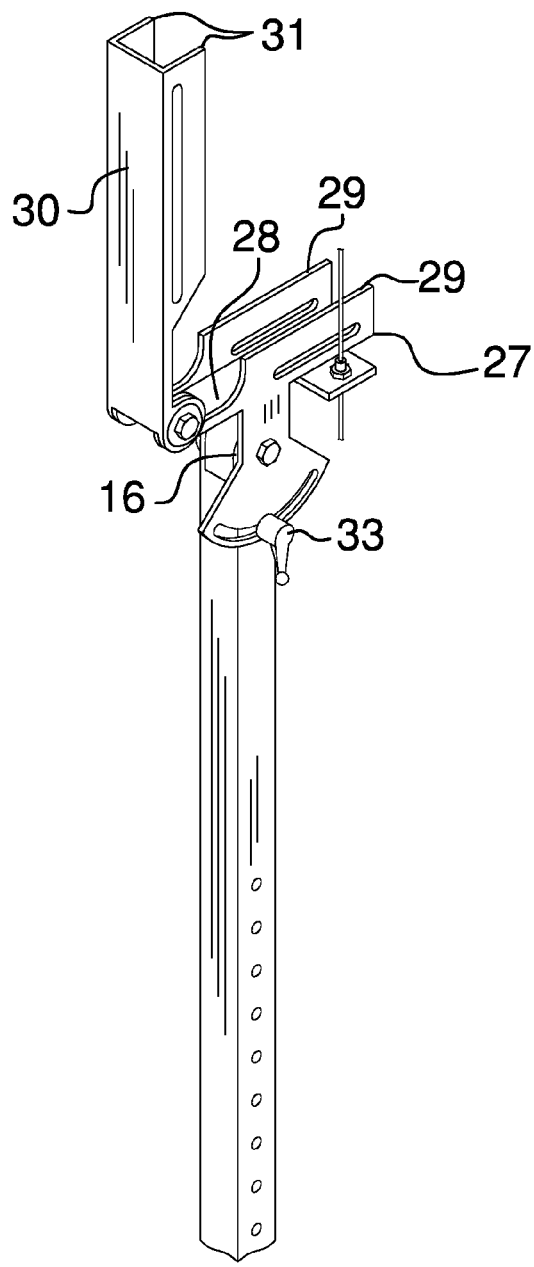
FIG. 4 is a broken, rear perspective view of a mount of an embodiment of the disclosure.
Figure 5:
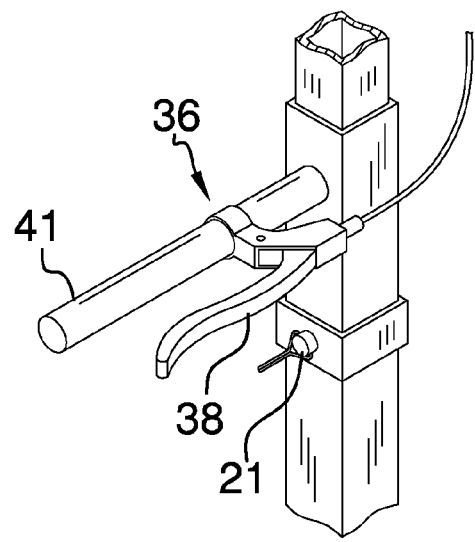
FIG. 5 is a broken, front perspective view of an actuator an embodiment of the disclosure.

With reference now to the drawings, and in particular to FIGS. 1 through 7 thereof, a new drill stabilizing device embodying the principles and concepts of an embodiment of the disclosure and generally designated by the reference numeral 10 will be described.

As best illustrated in FIGS. 1 through 7, the hand drill lifting and actuating apparatus 10 configured for usage with hand drills 70 and more particularly may be used with specific types of electric drills known as rotary hammers (also commonly known as hammer drills, roto-drills, or hammering drill), though the apparatus 10 might be used with any conventional pneumatic or electric drill as would be understandable to operators of such devices. The apparatus 10 generally comprises a post 12 that has a bottom end 14 and a top end 16. The post 12 is telescopic and includes an upper section 17 and a lower section 18. The lower section 18 slidably receives the upper section 17. The upper section 17 may further be telescopic and include a first portion 19 and a second portion 20 telescopically engaged together such that the second portion 20 is slidably received by the first portion 19. The first portion 19 is adjacent to the lower section 18 and a securing member 21 releasably secures the first portion 19 with respect to the second portion 20. The securing member 21 may include a conventional pin extending through the first 19 and second portions 20. The post 12 may be extended to a height greater than at least 8.0 feet.

A base 22 is attached to the bottom end 14 of the post 12. The base 22 has a planar bottom surface 23 to facilitate retention of the post 12 in a vertical orientation. The base 22 may also have a planar upper surface 24 to allow a person to stand on the base 22 and further stabilize the post 12.

A mount 26 is attached to the top end 16. The mount 26 is configured to releasably secure the drill 70 to the post 12. The mount 26 includes a saddle 27 with a bottom wall 28 and a pair of lateral walls 29 and a vertical wall 30 being attached to and extending upwardly from said saddle 27. The vertical wall 30 may include a pair of side walls 31. The drill 70 is placed on the saddle 27 between the lateral walls 29 and against the vertical wall 30 and between the side walls 31. Thus the drill 70 cannot move relative to the mount 26. The vertical wall 30 and saddle 27 may be pivotally coupled to each other to alter the angle between each to accommodate for differently configured drills 70. A strap 32 or other securing element may be attached to the mount 26 and extended around the drill 70 to secure the drill 70 to the mount 26. The mount 26 may be pivotable with respect to the post 12 to allow an angle of the drill 70 to be altered as needed. A locking member 33 engages the mount 26 and releasably locks the mount 26 with respect to the post 12.

An actuator 36 is mounted on the post 12 and is configured to engage a switch 71 on the drill 70 to turn the drill 70 on and in particular to pull the trigger, or switch 71, on the drill 70. The actuator 36 includes a grip 38 pivotally movable relative to the post 12 and a cable 39 that is coupled to the grip 38. The cable 39 has a free end 40 configured to engage the drill 70 and the free end 40 is pulled towards the grip 38 when the grip 38 is actuated. Thus, when the grip 38 is pulled the drill 70 will be turned on. The grip 38 may be mounted on a rod 41 that is attached to the post 12 and more particularly to the upper section 17 of the post 12.

A fulcrum 44 is attached to the lower section 18 of the post 12. A handle 46 has a first end 47 and a second end 48 wherein the first end 47 is pivotally coupled to the upper section 17. The handle 46 is pivotally coupled to the fulcrum 44 between the first 47 and second 48 ends so that the upper section 17 is lifted upwardly when the second end 48 is urged downwardly. In this manner the mount 26 is urged upwardly when the second end 48 is pulled downwardly.

The first end 47 may include a spindle 49 to which is pivotally coupled to a linkage 50 which in turn is pivotally coupled to a section of the handle 46. The linkage 46 allows the handle 46 to move towards and away from the post 12 as the upper section 17 is moved since a distal end 51 of the handle 46 relative to the second end 48 cannot remain at a fixed point relative to the post 12 as upper section 17 moves. The first end 47 may further include a fork 52 such that a pair of linkages 50 and a pair of spindles 49 are provided. The fulcrum 44 may include a receiver slot 53 into which the handle is positioned and pivotally secured.

Figure 6:
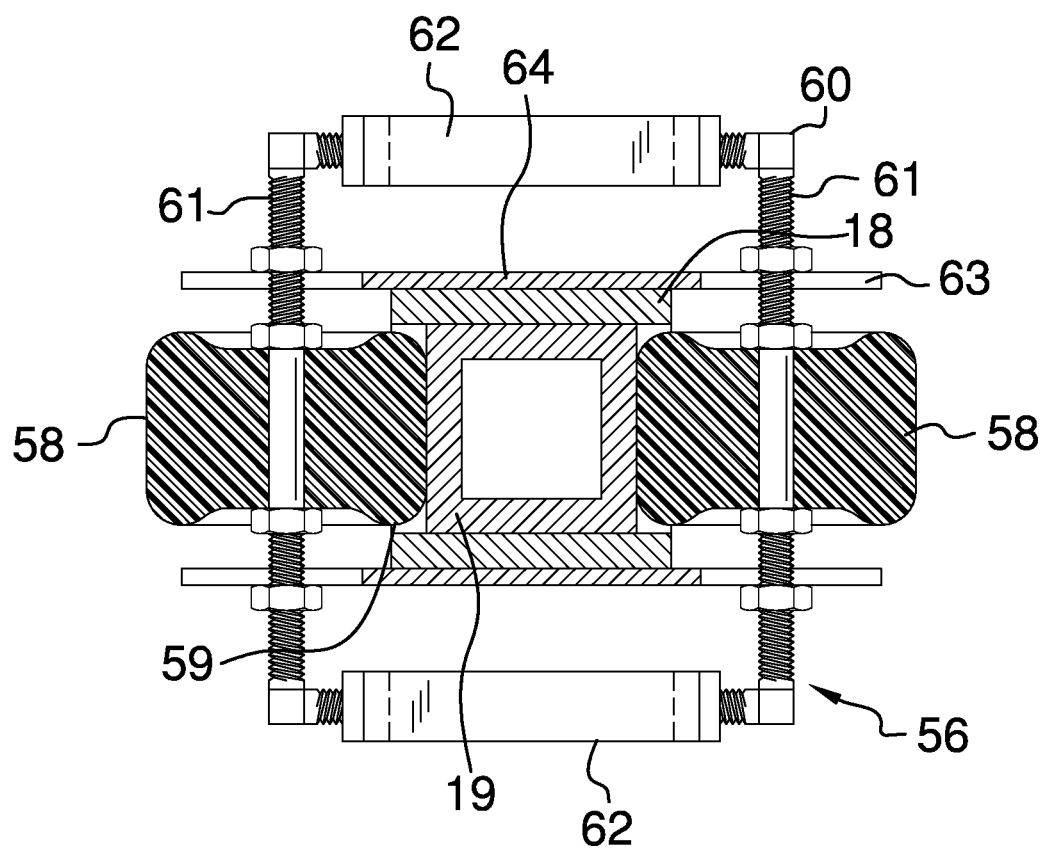
FIG. 6 is a cross-sectional view of an embodiment of the disclosure taken along line 6-6 of FIG. 1.
Figure 7:
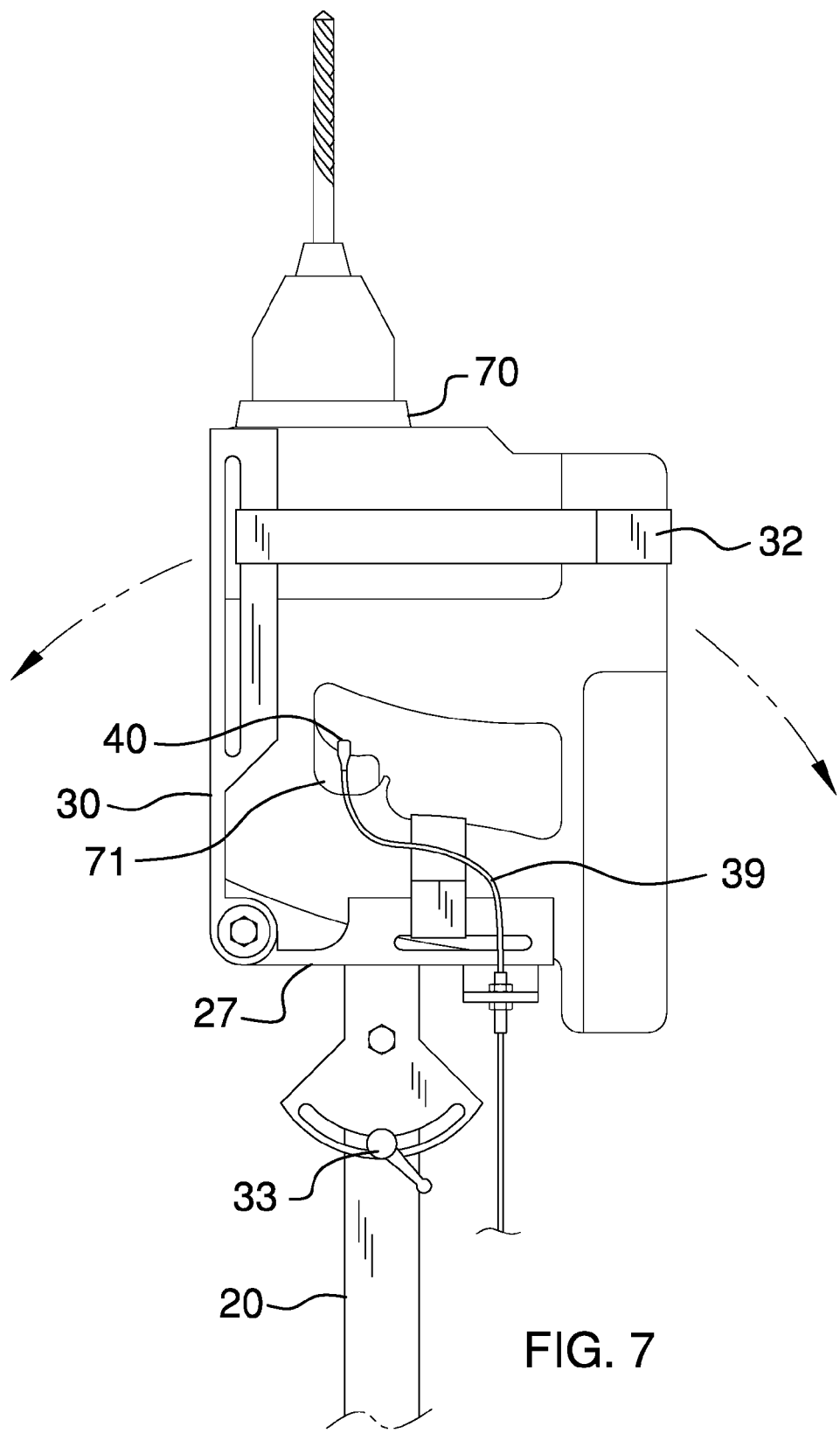
FIG. 7 is a broken, side in-use view of an embodiment of the disclosure.

A braking member 56 is mounted on the lower section 18 and mechanically engages the upper section 17. The braking member 56 is adjustable to selectively alter resistance of movement between the upper 17 and lower 18 sections. The braking member 56 may include one or more braking members 56. The braking members 56 may each include a pair of wheels 58 rotatably mounted on the lower section 18 and positioned on opposite sides of the post 12 relative to each other. Each wheel 58 is positioned adjacent to an opening 59 in the post 12 so that the wheels 58 can extend through the lower section 18 and abut the upper the upper section 17 positioned therein as shown in FIG. 6. The wheels 58 are mounted on a frame 60 with a pair of axles 61 each having one of the wheels 58 positioned thereon. The axles 61 are attached together by threaded couplers 62 wherein rotation of the couplers 62 in a first direction moves the axles 61 closer to each other and rotation in the second direction moves the axles 61 further apart from each other. The axles 61 may be slidably mounted in slots 63 extending in plates 64 that attached to the lower section 18. The wheels 58 are resiliently compressible and may be comprised of an elastomeric or plastic material. As the couplers 62 are rotated in the first direction, the wheels 58 are biased more firmly against the upper section 17. This increases friction between the wheels 58 and the axles 61 and prevents easy rotation of the wheels 58. In particular, the user may loosen the couplers 62 to move the mount 26 to a position adjacent to a surface to be drilled and then tighten the couplers 62 to prevent easy movement of the upper section 17.

In use, the drill 70 is placed on the mount 26 and the post 12 extended to a height such that the drill 70 is adjacent to a ceiling or other overhead structure into which a hole is to be bore. The apparatus 10 is then used to move the drill 70 upwardly as the drill 70 is turned on to bore the hole into the structure. The apparatus 10 allows for easy boring of overhead structures as compared to a person standing on a ladder or platform and holding the drill 70 with their hands over their heads. Further, the apparatus 10 facilitates straighter, more accurate bore formation as the apparatus 10 is more stable than a person holding a drill.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drill mount and actuation assembly comprising:
   a post having a bottom-most end and a top-most end, said post being telescopic and including an upper section and a lower section, wherein the lower section of the post further includes a first opening and a second opening through a cross-section of the lower section of the post, the first opening being located directly opposite the second opening on an opposing face of the lower section of the post, the first opening and the second opening exposing respective adjacent surfaces of the upper section of the post;
   one or more braking members that are selectively positioned to overlay the first opening and the second opening of the lower section of the post, the one or more braking members further including at least a first wheel and a second wheel, and wherein
   the first wheel and the second wheel mechanically engage the respective adjacent surfaces of the upper section of the post through the first opening and the second opening of the lower section of the post;
   a saddle being attached to the top-most end of said post, said saddle being configured to releasably secure a drill in a position above said top-most end of said post such that the drill is an extension of said post and moves in a linear direction parallel to a longitudinal axis of said post in response to said post being extended, said saddle being pivotable with respect to said post, a locking member engaging said saddle and releasably locking said saddle with respect to said post;
   an actuator being mounted on said post and being configured to engage a switch on the drill to turn the drill on;
   a fulcrum being attached to said lower section of said post; and
   a handle having a first end and a second end, said first end being pivotally coupled to said upper section, said handle being pivotally coupled to said fulcrum between said first end and said second end, said upper section being lifted upwardly when said second end is urged downwardly whereby said post is extended and said saddle is urged upwardly when said second end is pulled downwardly.

2. The drill mount and actuation assembly according to claim 1, wherein said upper section includes a first portion and a second portion being telescopically engaged such that said second portion is slidably received by said first portion, said first portion being adjacent to said lower section, a securing member releasably securing said first portion with respect to said second portion.

3. The drill mount and actuation assembly according to claim 1, further including a base being attached to said bottom-most end.

4. The drill mount and actuation assembly according to claim 1, wherein said actuator includes a grip pivotally movable relative to said post, a cable being coupled to said grip, said cable having a free end configured to engage the drill, said free end being pulled towards said grip when said grip is actuated.

5. The drill mount and actuation assembly according to claim 1, further including a braking member being mounted on said lower section and mechanically engaging said upper section, said braking member being adjustable to selectively alter resistance of movement between said upper section and said lower section.

6. The drill mount and actuation assembly according to claim 1, wherein individual brake members of the one or more brake members further including:
   a first plate and a second plate, the first plate being selectively positioned to overlay a side of the lower section of the post that is longitudinally adjacent to the first opening and the second opening, and the second plate being positioned directly opposite the first plate on an opposing face of the lower section of the post; and
   a first axle member and a second axle member that are selectively coupled to the first plate and the second plate, and wherein
   the first wheel and the second wheel are rotatably coupled to the first axle member and the second axle member, respectively, wherein the first wheel overlays the first opening and the second wheel overlays the second opening, the first wheel and the second wheel being configured to mechanically engage opposing surfaces of the upper section of the post through the first opening and the second opening of the lower section of the post, respectively.

7. The drill mount and actuation assembly according to claim 6, wherein the first opening and the first opening and the second opening are sized to permit at least a portion of the first wheel and the second wheel to protrude through the first opening and the second opening respectively.

8. The drill mount and actuation assembly according to claim 6, wherein the first plate and the second plate further include:
   a first axle receiving end and a second axle receiving end; and
   a first axle receiving slot that extends inward from the first axle receiving end and a second axle receiving slot that extends inward from the second axle receiving end, and wherein the first axle member and the second axle member are oriented to move laterally through one of the first axle receiving slot or the second axle receiving slot respectively.

9. The drill mount and actuation assembly according to claim 6, wherein the first axle member and second axle member include threaded portions at each respective free end, and further comprising:
   a first coupler and a second coupler that overlay an outer surface of the first plate and an outer surface of the second plate respectively, the first coupler and the second coupler further including threaded receptacles at each free end that are configured to mechanically engage the threaded portions at each respective free end of the first coupler and the second coupler, and
   whereby, the first coupler and the second coupler are configured to forceably rotate about respective longitudinal axes, a forceable rotation causing the first axle member and the second axle member to offset towards the lower section of the post thereby increasing a resistance between the first wheel and the second wheel that mechanically engage corresponding surfaces of the upper section of the post.

10. A drill mount and actuation assembly comprising:
    a post having a bottom-most end and a top-most end, said post being telescopic and including an upper section and a lower section, said lower section slidably receiving said upper section, said upper section including a first portion and a second portion being telescopically engaged such that said second portion is slidably received by said first portion, said first portion being adjacent to said lower section, wherein the lower section further includes a first opening and a second opening through a cross-section of the lower section, the first opening being located directly opposite the second opening on an opposing face of the lower section, the first opening and the second opening exposing respective adjacent surfaces of the upper section;
    a base being attached to said bottom-most end;
    a saddle being attached to said top-most end of said post, said saddle being configured to releasably secure a drill in a position above said top-most end of said post such that the drill is an extension of said post and moves in a linear direction parallel to a longitudinal axis of said post in response to said post being extended, said saddle being pivotable with respect to said post, a locking member engaging said saddle and releasably locking said saddle with respect to said post;
    an actuator being mounted on said post and being configured to engage a switch on the drill to turn the drill on, said actuator including a grip pivotally movable relative to said post, a cable being coupled to said grip, said cable having a free end configured to engage the drill, said free end being pulled towards said grip when said grip is actuated;
    a fulcrum being attached to said lower section of said post;
    a handle having a first end and a second end, said first end being pivotally coupled to said upper section, said handle being pivotally coupled to said fulcrum between said first end and second end, said upper section being lifted upwardly when said second end is urged downwardly whereby said post is extended and herein said saddle is urged upwardly when said second end is pulled downwardly; and
    a braking member being mounted on said lower section, the braking member being selectively positioned to overlay the first opening and the second opening of the lower section, the braking member further including at least a first wheel and a second wheel, and wherein the first wheel and the second wheel mechanically engage the respective adjacent surfaces of the upper section through the first opening and the second opening of the lower section, said braking member being adjustable to selectively alter resistance of movement of the first wheel and the second wheel between said upper section and lower section.

11. The drill mount and actuation assembly of claim 10, further comprising:
    a securing member releasably securing said first portion with respect to said second portion.

* * * * *